United States Patent
Nakayama et al.

(10) Patent No.: US 9,669,704 B2
(45) Date of Patent: Jun. 6, 2017

(54) AIR INTAKE STRUCTURE FOR SADDLE-RIDE TYPE VEHICLE

(71) Applicant: SUZUKI MOTOR CORPORATION, Hamamatsu-Shi, Shizuoka (JP)

(72) Inventors: Yoshihisa Nakayama, Hamamatsu (JP); Koji Kobayashi, Hamamatsu (JP); Yuki Shimizu, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/159,064

(22) Filed: May 19, 2016

(65) Prior Publication Data

US 2016/0368369 A1    Dec. 22, 2016

(30) Foreign Application Priority Data

Jun. 17, 2015    (JP) .................................. 2015-122230

(51) Int. Cl.
*B62M 7/00* (2010.01)
*B60K 13/02* (2006.01)
(Continued)

(52) U.S. Cl.
CPC ....... *B60K 13/02* (2013.01); *F02M 35/10013* (2013.01); *F02M 35/162* (2013.01); *B62K 11/00* (2013.01); *B62K 21/02* (2013.01)

(58) Field of Classification Search
CPC .. B62K 13/02; B62K 11/00; F02M 35/10013; F02M 35/162
(Continued)

(56) References Cited

U.S. PATENT DOCUMENTS

| | | | |
|---|---|---|---|
| 5,577,570 A | 11/1996 | Shiohara et al. | |
| 6,276,482 B1 * | 8/2001 | Moriya | B62J 17/02 180/229 |

(Continued)

FOREIGN PATENT DOCUMENTS

| | | |
|---|---|---|
| EP | 2103511 B1 | 7/2010 |
| EP | 2206911 B1 | 2/2011 |

(Continued)

OTHER PUBLICATIONS

German Office Action dated Jan. 11, 2017 issued in corresponding German Patent Application No. 102016110894.4.

*Primary Examiner* — Tony Winner
(74) *Attorney, Agent, or Firm* — Troutman Sanders LLP

(57) ABSTRACT

The air intake structure for a saddle-ride type vehicle includes a front cowl, a pair of right and left air duct portions, an air cleaner box, and a vehicle body frame. The front cowl includes a pair of right and left air intake ports. The pair of the right and left air duct portions guides air taken from the pair of the right and left air intake ports. The air cleaner box cleans the air guided by the pair of the right and left air duct portions. The vehicle body frame is branched backward from a steering head pipe disposed on a front side of a vehicle into a bifurcated shape with a pair of right and left. The vehicle body frame includes the air cleaner box between the branches of the bifurcated shape. The air duct portion includes a first air duct and a second air duct. The first air duct guides air to the air cleaner box from the air intake port through the vehicle body frame. The second air duct branches from the first air duct in a middle to guide air to the air cleaner box.

4 Claims, 8 Drawing Sheets

(51) Int. Cl.
*F02M 35/16* (2006.01)
*F02M 35/10* (2006.01)
*B62K 11/00* (2006.01)
*B62K 21/02* (2006.01)

(58) Field of Classification Search
USPC .................................... 180/68.3, 218, 219
See application file for complete search history.

(56) References Cited

U.S. PATENT DOCUMENTS

| | | | |
|---|---|---|---|
| 6,409,783 B1* | 6/2002 | Miyajima | F02M 35/04 123/198 E |
| 7,270,207 B2* | 9/2007 | Idei | F02B 61/02 180/219 |
| 7,380,624 B2 | 6/2008 | Momosaki | |
| 7,963,358 B2* | 6/2011 | Buell | B62J 35/00 180/225 |
| 8,146,693 B2* | 4/2012 | Oohashi | B60K 13/02 180/68.3 |
| 8,413,754 B2* | 4/2013 | Matsuda | B62K 11/04 180/219 |
| 2005/0051375 A1 | 3/2005 | Momosaki | |
| 2006/0027202 A1 | 2/2006 | Yoshikawa et al. | |

FOREIGN PATENT DOCUMENTS

| | | |
|---|---|---|
| EP | 1759970 B1 | 4/2012 |
| JP | 4340500 B2 | 10/2009 |
| JP | 2010058757 A | 3/2010 |
| JP | 4964618 B2 | 7/2012 |

* cited by examiner

AIR INTAKE STRUCTURE FOR SADDLE-RIDE TYPE VEHICLE

CROSS-REFERENCE TO RELATED APPLICATIONS

This application is based upon and claims the benefit of priority of the prior Japanese Patent Application No. 2015-122230, filed on Jun. 17, 2015, the entire contents of which are incorporated herein by reference.

BACKGROUND OF THE INVENTION

Field of the Invention

The present invention relates to an air intake structure for a saddle-ride type vehicle. For example, the present invention is preferable to be employed for a saddle-ride type vehicle such as a motorcycle.

Description of the Related Art

A motorcycle employs what is called a ram-air system that directly guides travelling air to an air cleaner box to improve air intake efficiency.

Patent Document 1 discloses an air intake structure where the travelling air introduced through a front end air intake port of an air inlet duct flows into a head portion with ram pressure, and is divided in right and left at the head pipe part to flow into right and left main frames, and simultaneously, a part of the travelling air flows into both air intake ducts.

Patent Document 2 discloses an air intake structure where the travelling air introduced through an air intake port of a front cowl flows through a front duct of an air duct, an inner duct in a main frame, and an intake passage in a rear duct to be taken into an engine as combustion air from an air box portion.

Patent Document 1: Japanese Patent No. 4340500
Patent Document 2: Japanese Patent No. 4964618

The air intake structures disclosed in Patent Document 1 and Patent Document 2 use the ram pressure generated during high-speed running to raise an intake air pressure in the air cleaner box for improving the air intake efficiency. However, there is a problem that it is difficult to increase an intake air flow rate into the air cleaner box during low-speed or middle-speed running that generates no ram pressure. In the case where a cross-sectional area of a duct is expanded to increase the intake air flow rate during low-speed or middle-speed running, the vehicle width is widen to result in a disadvantage in a design and aerodynamic.

SUMMARY OF THE INVENTION

The present invention has been made to solve the above-described problems. An object of the present invention is to provide an air intake structure to increase an intake air flow rate flowing into an air cleaner box when a vehicle runs at a low-speed or a middle-speed.

The air intake structure for a saddle-ride type vehicle of the present invention includes a front cowl, a pair of right and left air duct portions, an air cleaner box, and a vehicle body frame. The front cowl includes a pair of right and left air intake ports. The pair of the right and left air duct portions guides air taken from the pair of the right and left air intake ports. The air cleaner box cleans the air guided by the pair of the right and left air duct portions. The vehicle body frame is branched backward from a steering head pipe disposed on a front side of a vehicle into a bifurcated shape with a pair of right and left. The vehicle body frame includes the air cleaner box between the branches of the bifurcated shape. The air duct portion includes a first air duct and a second air duct. The first air duct is coupled to the air cleaner box from the air intake port through the vehicle body frame. The second air duct branches from the first air duct in a middle to be coupled to the air cleaner box.

DETAILED DESCRIPTION OF THE PREFERRED EMBODIMENTS

The following describes a preferred embodiment of an air intake structure for a saddle-ride type vehicle according to the present invention based on the drawings. Here, a description will be given of a case where the air intake structure is applied to a motorcycle.

Figure 1:
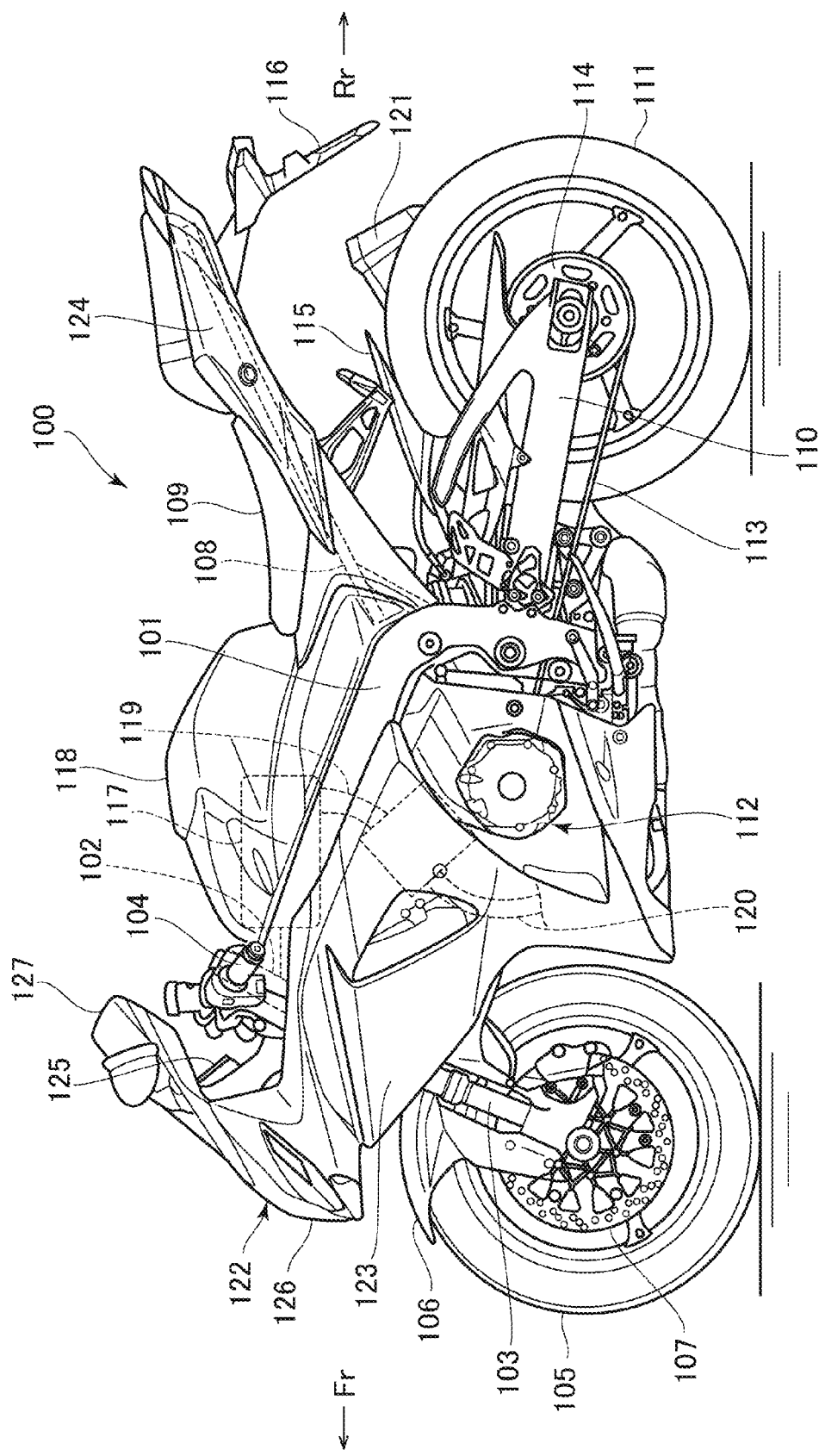
FIG. 1 is a left side view illustrating a motorcycle.

FIG. 1 is a left side view of a motorcycle 100. First, an overall configuration of the motorcycle 100 will be described with reference to FIG. 1. In the following description, in each drawing including FIG. 1, an arrow Fr indicates the front of the vehicle, an arrow Rr indicates the rear of the vehicle, an arrow R indicates the right side of the vehicle, and an arrow L indicates the left side of the vehicle, as necessary.

The motorcycle 100 includes a vehicle body frame 101 (main frame) made of steel or aluminum alloy that forms the frame of the vehicle. The motorcycle 100 includes a steering head pipe 102 combined with the front of the vehicle body frame 101 on the front side of the vehicle. The steering head pipe 102 turnably supports a pair of right and left front forks 103 via a steering shaft 128 and a fork bracket 129 (see FIG. 3 described below). The front fork 103 includes a handlebar 104 fixed on the upper end. The front fork 103 rotatably supports a front wheel 105 as a steered wheel on the lower portion. The front wheel 105 is covered upward with a front fender 106. The front wheel 105 includes a brake disc 107 that integrally rotates with the front wheel 105.

The vehicle body frame 101 is integrally combined with a rear portion of the steering head pipe 102. The vehicle body frame 101 is branched backward into a bifurcated shape with a pair of right and left, and is disposed to extend backward and obliquely downward from the steering head pipe 102 while widening. In this embodiment, what is called a twin-spar frame that is used for a vehicle required for a high-speed performance is employed. From near of the rear portion of the vehicle body frame 101, a seat rail 108 extends backward while appropriately inclining backward and obliquely upward. The seat rail 108 supports a seat 109. The vehicle body frame 101 includes a swing arm 110 that is swingably combined with the rear portion of the vehicle body frame 101. The swing arm 110 rotatably supports a rear wheel 111 on the rear end of the swing arm 110. The rear wheel 111 is rotatably driven via a driven sprocket 114 around which a chain 113 is wound to transmit the power of an engine 112. The rear wheel 111 is covered forward and obliquely upward with an inner fender 115, and covered backward and obliquely upward with a rear fender 116.

The motorcycle 100 includes an air cleaner box 117 upward the engine 112 between the branches of the bifurcated vehicle body frame 101. The air cleaner box 117 is covered with a tank cover 118 from upward together with a fuel tank (not illustrated) disposed ahead of the seat 109. The air cleaner box 117 cleans air taken via an air intake structure described later to supply the engine 112 via an intake air pipe 119. The engine 112 is also supplied with a fuel inside the fuel tank by a fuel supply device (not illustrated). The exhaust gas burned inside the engine 112 passes through an exhaust pipe 120 to be discharged from a muffler 121.

In the vehicle exterior, the front portion and the side portion of the vehicle are respectively covered with a front cowl 122 and a side cowl 123. The rear portion and the side portion of the vehicle are covered with a seat cowl 124. The exterior parts such as the front cowl 122, the side cowl 123 and the seat cowl 124 form the appearance form of the vehicle having a streamline shape. The motorcycle 100 includes a meter unit 125 including a speedometer on a position that is forward the steering head pipe 102 and covered with the front cowl 122.

Figure 2:
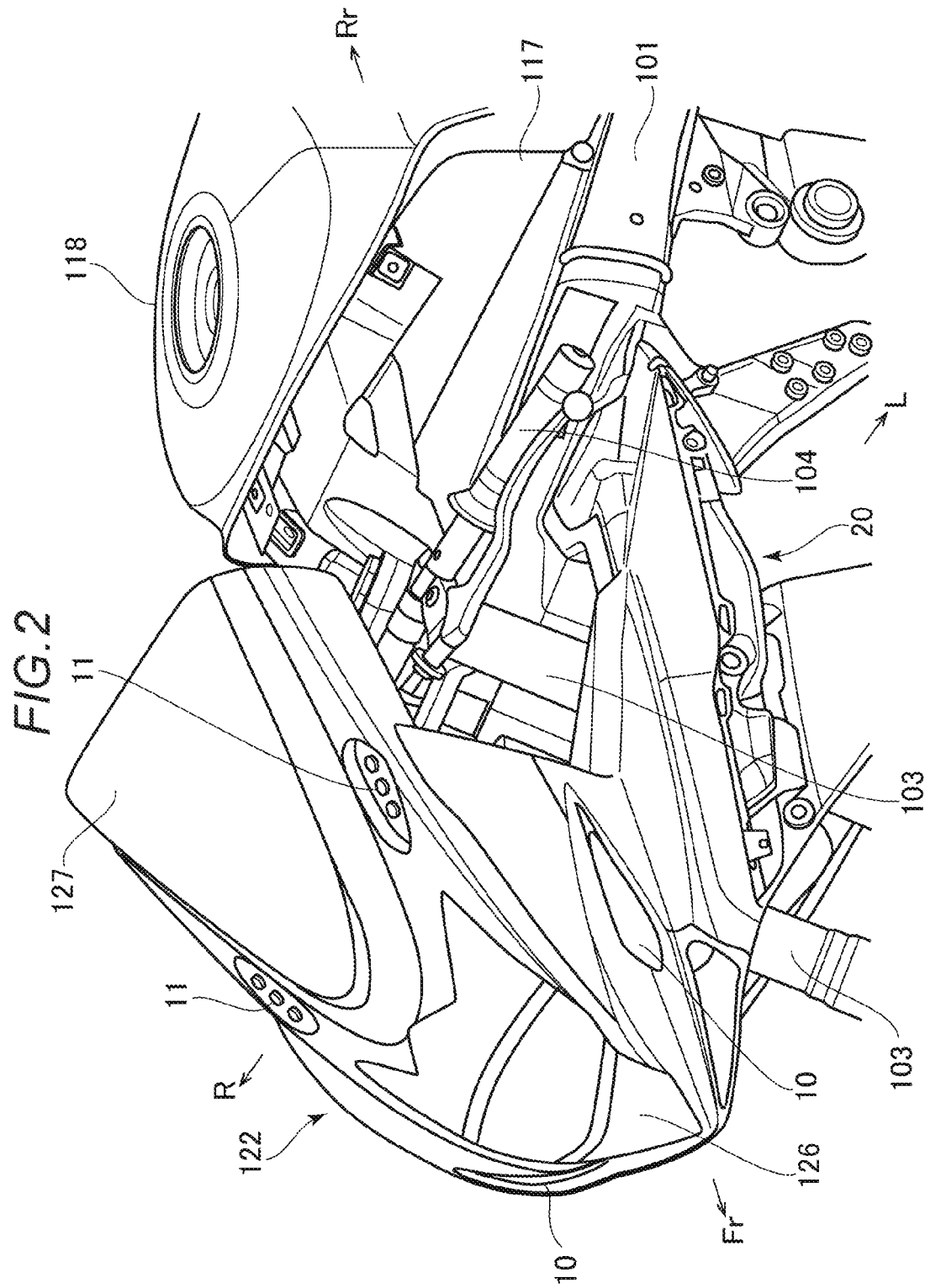
FIG. 2 is a perspective view illustrating the motorcycle viewed from the front.

FIG. 2 is a perspective view of the motorcycle 100 viewed from the front.

As illustrated in FIG. 2, the front cowl 122 includes a lamp unit 126 on the forward end to illuminate the front of the vehicle, and a windshield 127 disposed on the upper side of the lamp unit 126. The front cowl 122 includes a pair of air intake ports 10 on both sides of right and left across the lamp unit 126. The air intake port 10 is disposed to open forward. When the motorcycle 100 travels, air flows into the air intake port 10 from the front. The air intake port 10 is disposed inclining so as to close to the lamp unit 126 toward the downward in accordance with the streamline shape of the front cowl 122. The front cowl 122 includes a mounting portion 11, to which a brace 50 (described later) is mounted, on both sides of right and left across the windshield 127.

The motorcycle 100 includes a pair of right and left air duct portions 20 between the front cowl 122 and the air cleaner box 117 along an approximately front-rear direction. The air duct portion 20 guides the air flowed from the air intake port 10 to the air cleaner box 117. In the air intake structure of the embodiment, the air duct portion 20 functions to increase the flow rate of the intake air guided into the air cleaner box 117 during low-speed or middle-speed running that generates no ram pressure.

Figure 3:
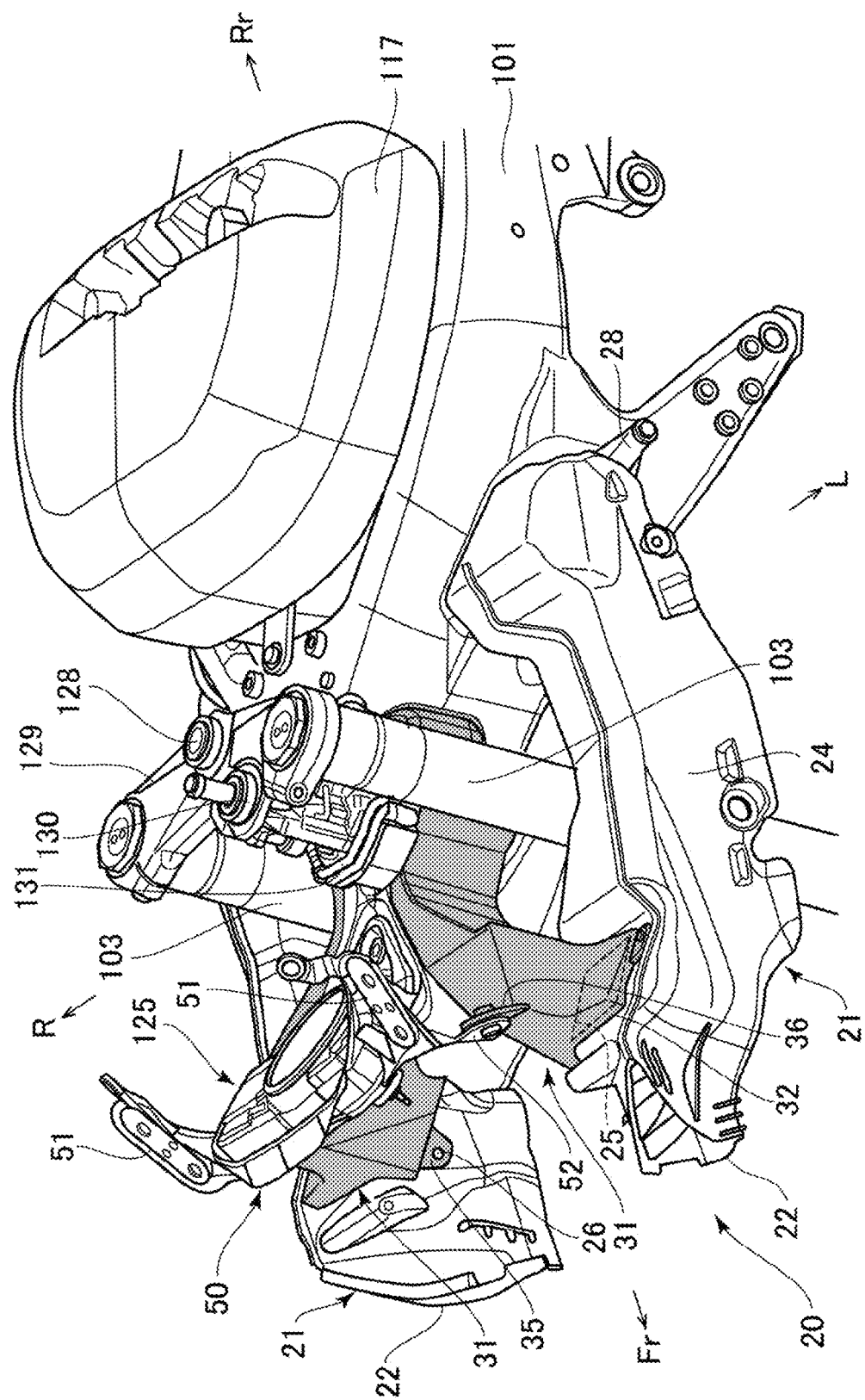
FIG. 3 is a perspective view illustrating a peripheral configuration of an air duct portion.
Figure 4:
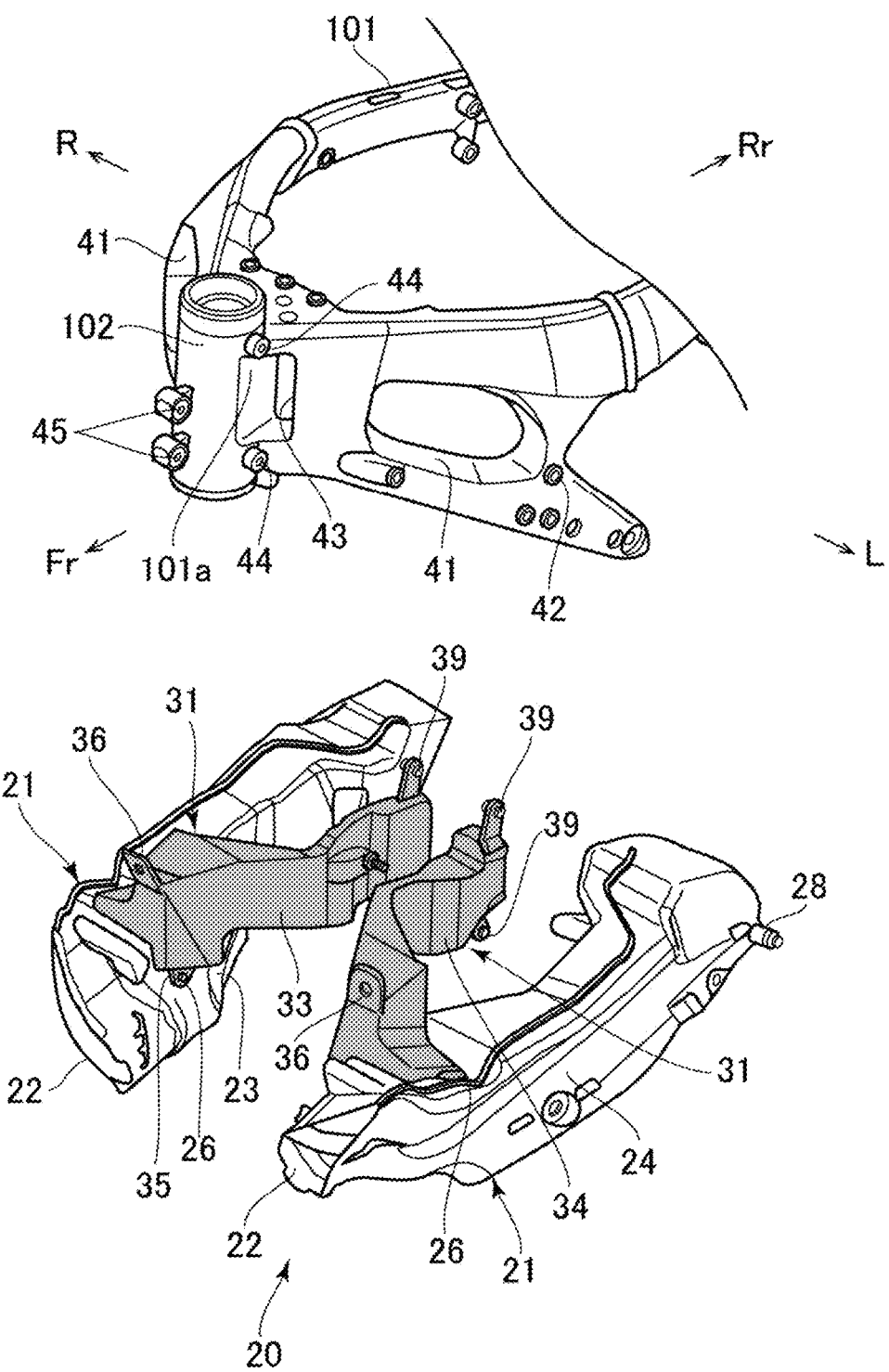
FIG. 4 is a perspective view illustrating the air duct portion and a vehicle body frame.
Figure 5:
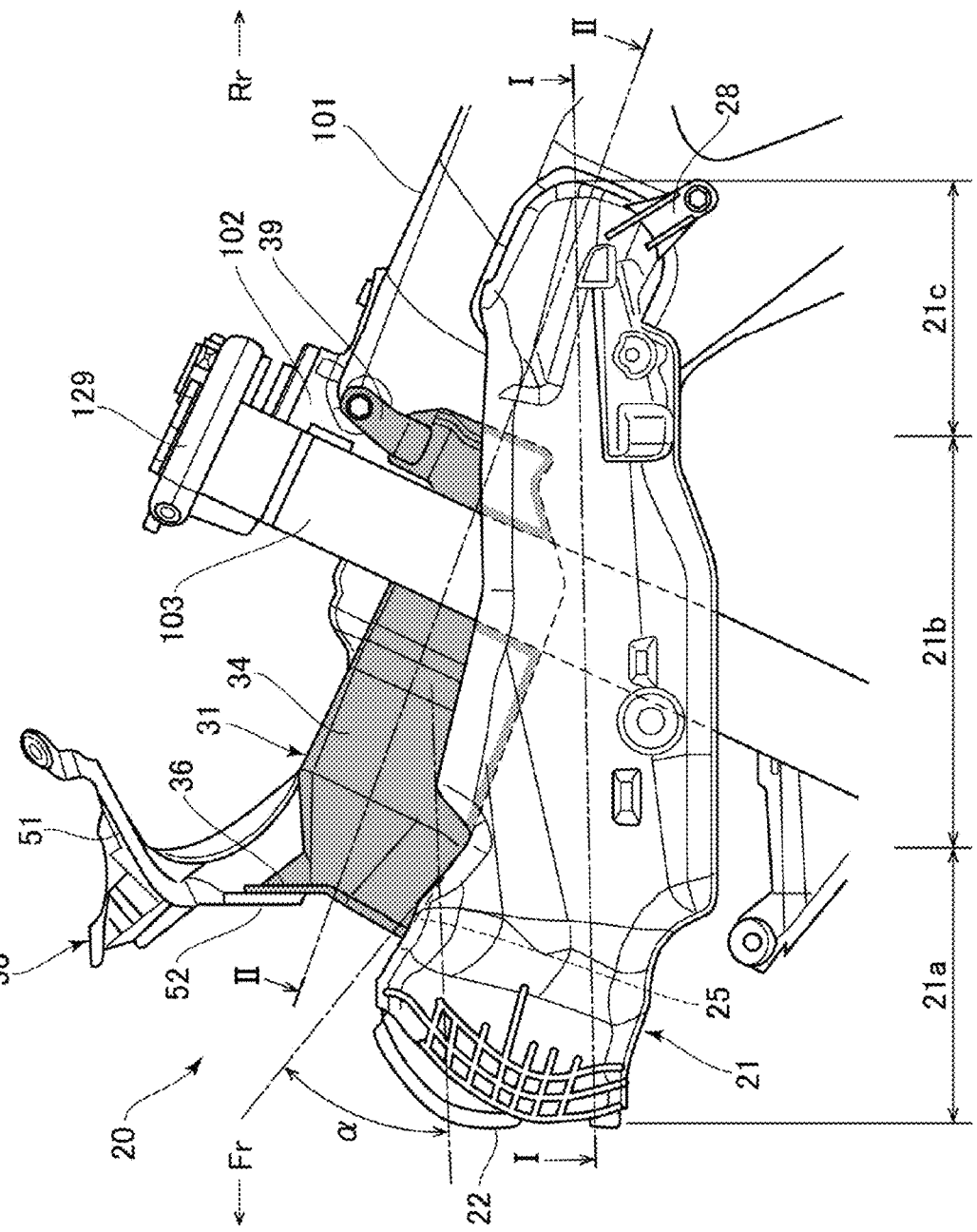
FIG. 5 is a side view illustrating the air duct portion.
Figure 6:
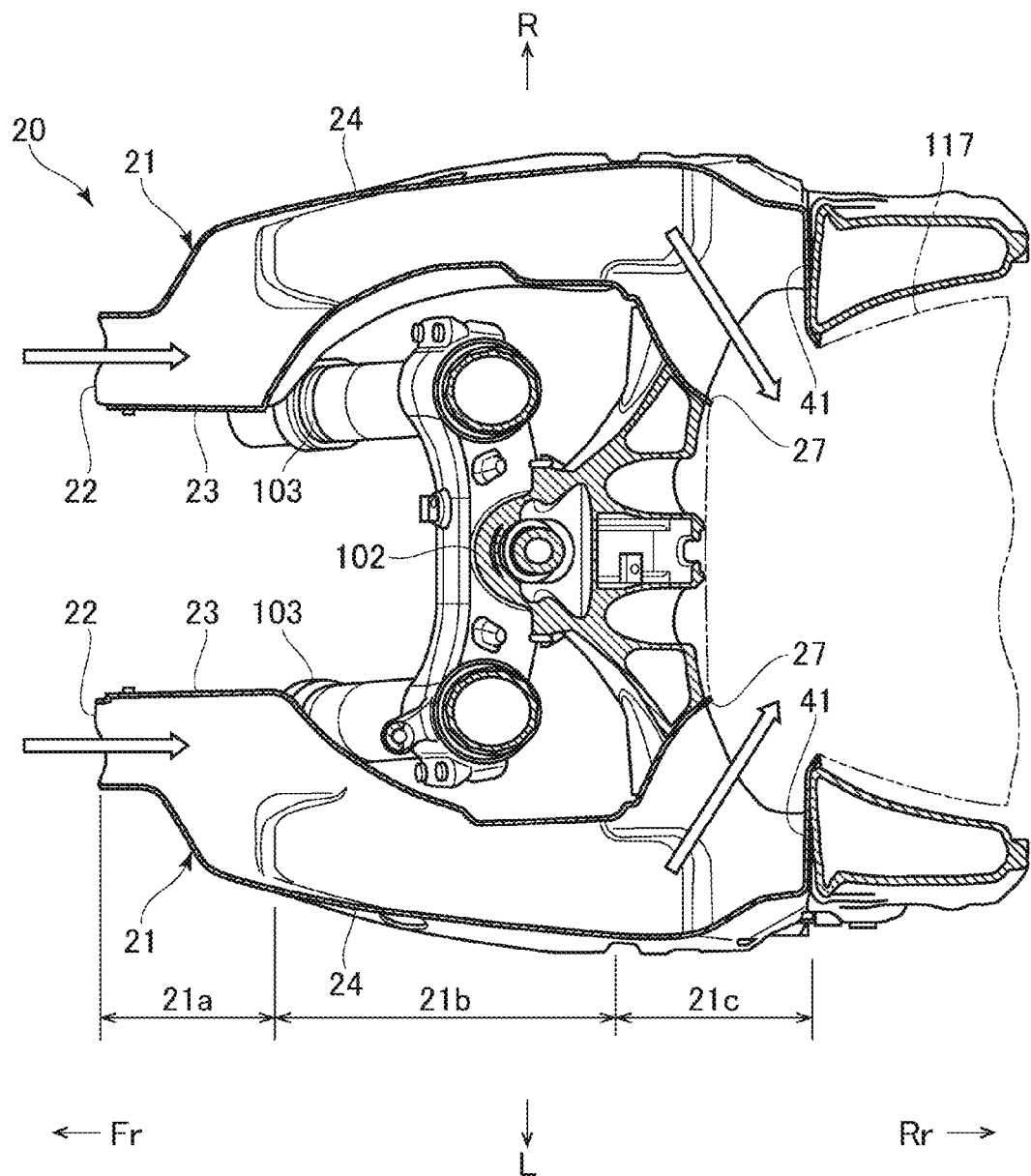
FIG. 6 is a cross-sectional view illustrating the air duct portion.
Figure 7:
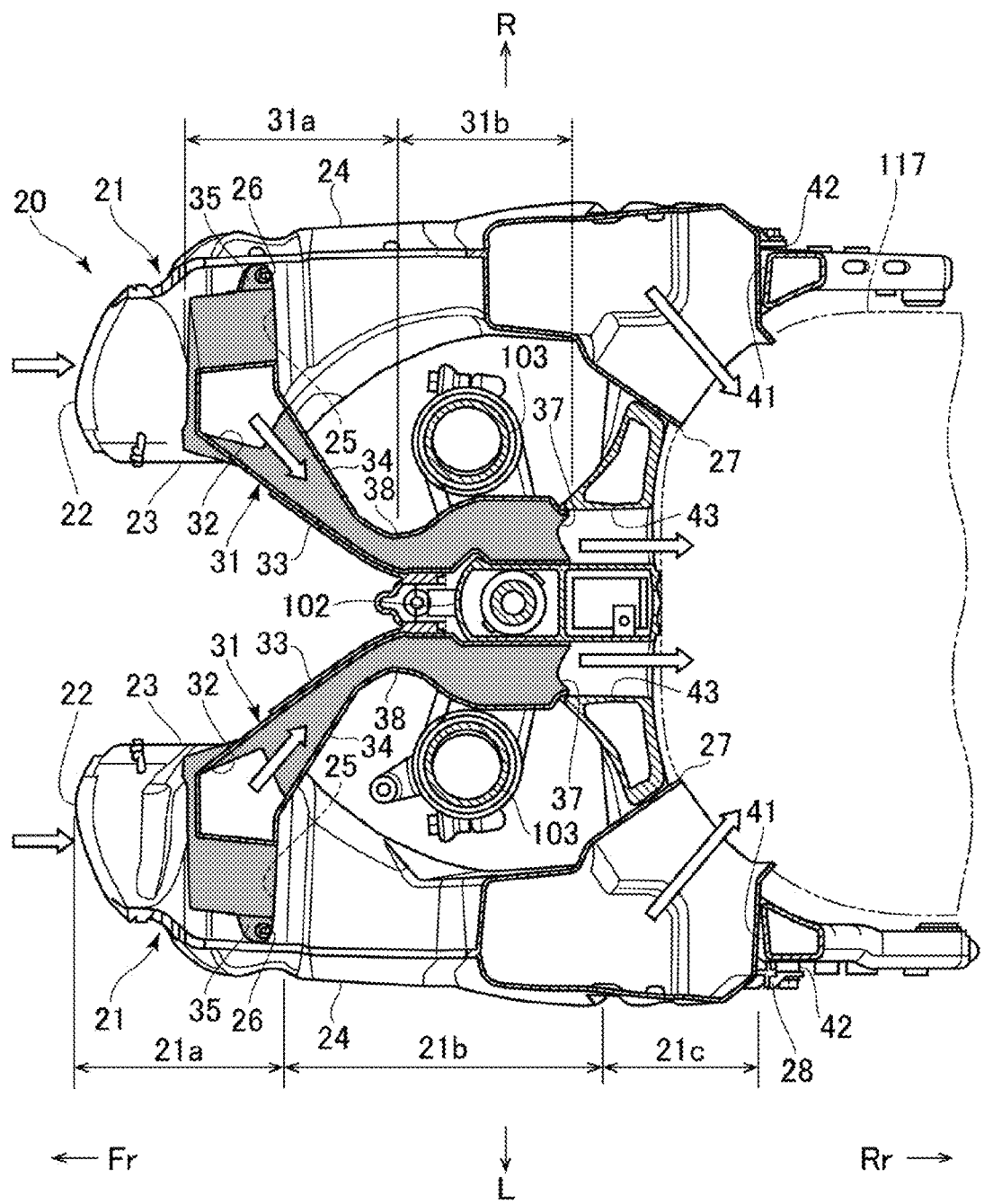
FIG. 7 is a cross-sectional view illustrating the air duct portion.

The following specifically describes the air intake structure according to the embodiment with reference to FIG. 3 to FIG. 7. FIG. 3 is a perspective view illustrating a peripheral configuration of the air duct portion 20, and a drawing omitted the front cowl 122 and similar part illustrated in FIG. 2. FIG. 4 is a perspective view illustrating the air duct portion 20 and the vehicle body frame 101. FIG. 5 is a side view illustrating the air duct portion 20. FIG. 6 is a cross-sectional view taken along a line I-I illustrated in FIG. 5, and FIG. 7 is a cross-sectional view taken along a line II-II illustrated in FIG. 5. The pair of the air duct portions 20 is configured in approximately symmetry. Then, the description will be given mainly of the left side air duct portion 20, and like reference numerals designate corresponding or identical elements to omit the explanation of the right side air duct portion 20 as necessary.

First, a description will be given of the air duct portion 20.

The air duct portion 20 includes a first air duct 21 as a main duct and a second air duct 31 as a sub-duct. The second air duct 31 branches from the first air duct 21. The first air duct 21 and the second air duct 31 are made of a synthetic resin. In each drawing, the second air duct 31 is colored with gray for ease of understanding.

The first air duct 21 guides air from the air intake port 10 to the air cleaner box 117 passing through the vehicle body frame 101. The first air duct 21 is disposed along the approximately front-rear direction. Specifically, as illustrated in FIG. 5, the first air duct 21 extends approximately horizontally along the front-rear direction while changing a height dimension in side view. On the other hand, as illustrated in FIG. 6, the first air duct 21 is curved as a whole around the outside (the outside in the vehicle-width direction) of the pair of the front forks 103 in plan view.

Here, the first air duct 21 is divided into three parts of a front half portion 21a, an intermediate portion 21b, and a rear half portion 21c to facilitate explanations.

The front half portion 21a is disposed ahead of the front fork 103. The front half portion 21a includes a front opening portion 22 on the front end. The front opening portion 22 is formed in a shape approximately matched with the air intake port 10 of the front cowl 122, and communicated with the air intake port 10. The front half portion 21a has a shape approximately matched with the air intake port 10 from the front end to the middle. As illustrated in FIG. 5, the front half portion 21a slightly inclines downward toward the rear in side view. Here, the front half portion 21a inclines with a top surface angle α of approximately 40 degree. On the other hand, as illustrated in FIG. 6, the front half portion 21a includes an inner sidewall portion 23 and an outer sidewall portion 24. In plan view, the inner sidewall portion 23 linearly extends backward, and the outer sidewall portion 24 bulges outward toward the rear.

The front half portion 21a includes a branch hole 25 to communicate with the second air duct 31 on the top surface (see FIG. 3 and FIG. 7). Here, as illustrated in FIG. 5, since the top surface of the front half portion 21a inclines with the angle α, the branch hole 25 obliquely opens backward and upward. The front half portion 21a includes a plurality of engaging portions 26 in a shape of a protrusion on the peripheral area of the branch hole 25. The engaging portions 26 engage with the first air duct 21.

The intermediate portion 21b is disposed on the outside of the front fork 103. As illustrated in FIG. 5, the intermediate portion 21b decreases the height dimension toward the rear in side view. On the other hand, as illustrated in FIG. 6, in the intermediate portion 21b, the inner sidewall portion 23 and the outer sidewall portion 24 bulge outward toward the rear so as to avoid the front fork 103, and then, linearly extend backward, in plan view.

The rear half portion 21c is disposed on the rear of the front fork 103. The rear half portion 21c includes a rear opening portion 27 on the rear end. As illustrated in FIG. 6, in the rear half portion 21c, in plan view, while the inner sidewall portion 23 inclines inward (the center side in the vehicle body width direction) toward the rear, the outer sidewall portion 24 extends backward and then bends inward. Accordingly, the rear opening portion 27 obliquely opens inward and backward. The rear half portion 21c includes a mounting portion 28 on the lower end to be mounted on the vehicle body frame 101.

The second air duct 31 branches from the first air duct 21 in the middle to guide the air to the air cleaner box 117. The second air duct 31 is disposed along the approximately front-rear direction. Specifically, as illustrated in FIG. 5, in side view, the second air duct 31 partially overlaps the first air duct 21, and extends so as to slightly incline downward toward the rear along the front-rear direction. Specifically, the second air duct 31 inclines approximately parallel to the inclination of the vehicle body frame 101. On the other hand, as illustrated in FIG. 7, the second air duct 31 is disposed around the inside of the pair of the front forks 103 in plan view.

Here, the second air duct 31 is divided into two parts of a front half portion 31a and a rear half portion 31b to facilitate explanations.

The front half portion 31a is disposed ahead of the front fork 103. The front half portion 31a includes a front opening portion 32 (see FIG. 3 and FIG. 7). The front opening portion 32 obliquely opens forward and downward so as to communicate with the branch hole 25 of the first air duct 21. As illustrated in FIG. 7, the front half portion 31a includes an inner sidewall portion 33 that inclines inward toward the rear. On the other hand, the front half portion 31a includes an outer sidewall portion 34 that is offset inward from the front opening portion 32 and inclines inward toward the rear. The front half portion 31a includes an engaged portion 35 on the peripheral area of the front opening portion 32. The engaged portion 35 includes a hole that is engaged with the engaging portion 26 of the first air duct 21. The front half portion 31a includes a plate-shaped co-fastened portion 36 on the front end. The co-fastened portion 36 is fastened together with the front cowl 122 to the brace 50.

The rear half portion 31b is disposed on the inside of the front fork 103. Specifically, the rear half portion 31b is inserted between the front fork 103 and the steering head pipe 102 in the front-rear direction. The rear half portion 31b includes a rear opening portion 37 on the rear end. As illustrated in FIG. 7, in the rear half portion 31b, the inner sidewall portion 33 linearly extends backward in plan view. On the other hand, the outer sidewall portion 34 bulges outward toward the rear, and then, linearly extends backward. Accordingly, the outer sidewall portion 34 includes a curved depressed portion 38 on a boundary of the rear half portion 31b and the front half portion 31a. Disposing the depressed portion 38 prevents the front fork 103 from the interference with the second air duct 31 while the front fork 103 is rotating. The rear half portion 31b includes a mounting portion 39 on the upper and lower sides to be mounted on the vehicle body frame 101.

As illustrated in FIG. 3, of the pair of the second air ducts 31, the left side second air duct 31 extends in the front-rear direction so as to pass through below a key cylinder 130 and over a steering damper 131.

Next, a description will be given of the vehicle body frame 101.

As illustrated in FIG. 4, the vehicle body frame 101 includes a pair of right and left first holes 41 and a pair of right and left second holes 43. In this embodiment, the first hole 41 has a larger opening area than the opening area of the second hole 43.

The first hole 41 is disposed on a part of the vehicle body frame 101 branched from the steering head pipe 102 in a bifurcated shape and inclining. The vehicle body frame 101 includes a mounted portion 42 on a part close to the first hole 41. To the mounted portion 42, the mounting portion 28 of the first air duct 21 is mounted.

The second hole 43 is disposed close to the steering head pipe 102 on both right and left sides of the vehicle body frame 101 along the front-rear direction. Accordingly, the pair of the right and left second holes 43 is disposed between the pair of the right and left first holes 41. The steering head pipe 102 includes a vertical surface 101a on both right and left sides continued to the second hole 43 along the front-rear direction. The vehicle body frame 101 includes a mounted portion 44 on the upper and lower sides close to the second hole 43 to mount the mounting portion 39 of the second air duct 31.

Here, the first air duct 21 is mounted on the vehicle body frame 101 such that in a state where the rear half portion 21c is inserted from the outside of the first hole 41, a fixation screw of the mounting portion 28 of the first air duct 21 is fastened to the mounted portion 42 of the vehicle body frame 101, as illustrated in FIG. 6 and FIG. 7. In this state, the rear opening portion 27 of the first air duct 21 is exposed from the first hole 41 to be communicated with the inside of the air cleaner box 117.

On the other hand, the second air duct 31 is mounted on the vehicle body frame 101 such that in a state where the rear half portion 31b is communicated with the second hole 43, the fixation screw of the mounting portion 39 of the second air duct 31 is fastened to the mounted portion 44 of the vehicle body frame 101, as illustrated in FIG. 7. The rear half portion 31b of the second air duct 31 is not inserted into the second hole 43, and the rear opening portion 37 of the second air duct 31 communicates with the inside of the air cleaner box 117 via the second hole 43.

Figure 8:
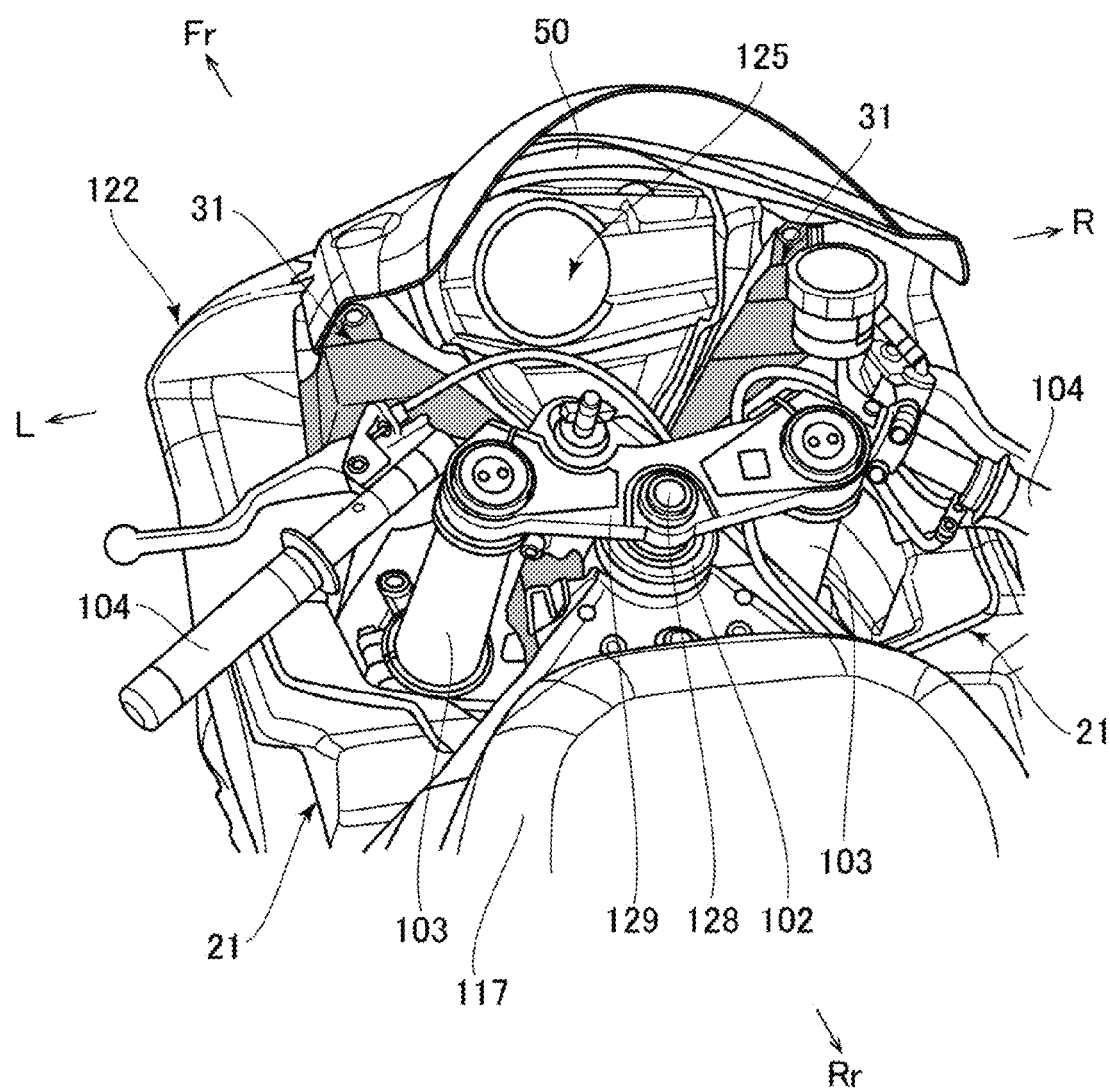
FIG. 8 is a perspective view illustrating a peripheral configuration of a meter unit.

As illustrated in FIG. 4, the steering head pipe 102 includes a fixed portion 45 on the front end to fix the brace 50. The brace 50 is made of aluminum alloy for example, and formed by casting. The brace 50 mainly supports the meter unit 125 and the front cowl 122. As illustrated in FIG. 3 and FIG. 8 (described below), the brace 50 has a fan shape expanding to right and left toward the front, and opens to dispose the meter unit 125 in the center. The brace 50 extends obliquely upward from the front end of the steering head pipe 102 passing between the pair of the right and left second air ducts 31. In other words, the second air duct 31 inclines outward toward the front along both sides of the fan shape of the brace 50.

As illustrated in FIG. 3, the brace 50 includes a pair of plate-shaped mounted portions 51 on upward both right and left sides, and a plate-shaped mounted portion 52 on downward both right and left sides. The mounted portion 51 is a portion to mount the front cowl 122 on the brace 50. The mounted portion 52 is a portion to fasten the second air duct 31 together with the front cowl 122. Fastening the mounting portion 11 of the front cowl 122 to the mounted portion 51 of the brace 50 with the screw causes the front cowl 122 to be mounted on the brace 50. Fastening the mounted portion 52 of the brace 50 together with the co-fastened portion 36 of the second air duct 31 to a mounting portion of the front cowl 122 (not illustrated) with the screw causes the front cowl 122 and the second air duct 31 to be mounted on the brace 50. Accordingly, the second air duct 31 supports a part of a load on the brace 50 via the co-fastened portion 36 and the mounted portion 52.

FIG. 8 is a perspective view illustrating a peripheral configuration of the meter unit 125. As illustrated in FIG. 8, the brace 50 includes the second air duct 31 on both right and left sides. Here, the second air duct 31 inclines toward the front along both sides of the fan shape of the brace 50. This ensures the second air duct 31 to cover such as a traveling surface and a wiring from upward so as not to be looked from both right and left sides of the brace 50 viewed from a vehicle occupant seated on the seat 109. Then, the second air duct 31 can be caused to also function as a decorative cover around the meter unit 125.

Next, a description will be given of the action of the air intake structure configured as described above.

When the motorcycle 100 is traveling at high-speed that generates the ram pressure, the air flows in from the front through the air intake port 10 of the front cowl 122. The air flowed in from the air intake port 10 flows into the first air duct 21 through the front opening portion 22 of the first air duct 21 that communicates with the air intake port 10. Here, in the case where the motorcycle 100 is traveling at high-speed, since the air passes a route easy to flow, the air mainly flows into the first air duct 21 that approximately horizontally extends along the front-rear direction, with little air flowing into the second air duct 31 that branches from the first air duct 21. The air flowing inside the first air duct 21 flows into the air cleaner box 117 through the rear opening portion 27 of the first air duct 21.

Thus, during high-speed running, the air taken from the air intake port 10 is mainly guided to the air cleaner box 117 by the first air duct 21. At this time, the ram pressure generated during high-speed running increases the pressure of intake air inside the air cleaner box 117 to improve the air intake efficiency.

Similarly, in the case where the motorcycle 100 is running at low-speed or middle-speed that generates no ram pressure, the air flows in from the front through the air intake port 10 of the front cowl 122. The air flowed in from the air intake port 10 flows into the first air duct 21 through the front opening portion 22 of the first air duct 21 that communicates with the air intake port 10. Here, in the case where the motorcycle 100 is running at low-speed or middle-speed, since the air passes a route that can flow, the air flows into the second air duct 31 that branches from the first air duct 21 in addition to the first air duct 21. The air flowing inside the first air duct 21 and the second air duct 31 flows into the air cleaner box 117 through the rear opening portion 27 of the first air duct 21 and the rear opening portion 37 of the second air duct 31, respectively.

Thus, during low-speed or middle-speed running, the air taken from the air intake port 10 is guided to the air cleaner box 117 by also the second air duct 31 in addition to the first air duct 21. That is, even during low-speed or middle-speed running where it is difficult to generate the ram pressure, the intake air flow rate flowing into the air cleaner box 117 can be increased by an amount of the air that flows inside the second air duct 31.

As described above, according to the embodiment, in addition to the first air duct 21, the second air duct 31, which branches from the first air duct 21, also guides the air to the air cleaner box 117. This expands the flow passage area where the air can flow in the case of low-speed or middle-speed running. Accordingly, even during low-speed or middle-speed running where it is difficult to generate the ram pressure, the intake air flow rate flowing into the air cleaner box 117 can be increased. Causing the second air duct 31 to branch from the first air duct 21 eliminates the need to increase the opening area of the air intake port 10 of the front cowl 122. This reduces the influence on the appearance design of the front cowl 122.

According to the embodiment, the vehicle body frame 101 includes the pair of the right and left first holes 41 and the pair of the right and left second holes 43 that are disposed between the pair of the right and left first holes 41. Then, the first air duct 21 guides the air to the air cleaner box 117 through the first hole 41. The second air duct 31 is inserted between the pair of the right and left front forks 103, and guides the air to the air cleaner box 117 through the second hole 43. Accordingly, the second air duct 31 is disposed inside the first air duct 21 of the vehicle. This prevents the vehicle width from expanded. The first hole 41 and the second hole 43 can be disposed away from one another. This prevents the rigidity of the vehicle body frame 101 from decreased.

According to the embodiment, the first air duct 21 includes the branch hole 25 on the top surface, and the second air duct 31 includes the front opening portion 32 that communicates with the branch hole 25. The front opening portion 32 obliquely opens forward and downward. Here, opening the front opening portion 32 forward ensures the air taken from the front of the vehicle to be easily branched into the second air duct 31. On the other hand, opening the front opening portion 32 downward reduces the invasion of rain and dirt into the second air duct 31.

According to the embodiment, the second air duct 31 is disposed on both right and left sides across the brace 50. Accordingly, such as the traveling surface and the wiring, which are looked from both right and left sides of the brace 50, can be covered with the second air duct 31. That is, the second air duct 31 can be also functioned as the decorative cover around the meter unit 125. This eliminates the need for an additional decorative cover to be disposed, and saves the production cost. The second air duct 31 also supports a part of the load on the brace 50 via the mounted portion 52 and the co-fastened portion 36. This eliminates the need for upsizing the brace 50 to be supported by other components. Then, the downsizing and the weight reduction of the brace 50 is ensured.

While the preferred embodiment of the present invention has been described, the present invention is not limited only to the above-described embodiment. Changes and similar modification are possible within the scope of the present invention.

While in the above-described embodiment, the description was given of the case where the second air duct 31 guides the air to the air cleaner box 117 through the second hole 43 of the vehicle body frame 101, the disclosure is not limited to the case. That is, for example, the second air duct 31 may be directly coupled to the air cleaner box 117 from the upward of the vehicle body frame 101 without passing through the vehicle body frame 101.

While in the above-described embodiment, the description was given of the case where the air intake structure of the present invention is applied to the motorcycle 100, the disclosure is not limited to the case. The air intake structure of the present invention can be applied to the saddle-ride type vehicle such as a three-wheeled automobile.

According to the present invention, the intake air flow rate flowing into the air cleaner box can be increased when the vehicle runs at a low-speed or a middle-speed.

What is claimed is:

1. An air intake structure for a saddle-ride vehicle, comprising:
   a front cowl that includes a pair of right and left air intake ports;
   a pair of right and left air duct portions that guides air, the air being taken from the pair of the right and left air intake ports;
   an air cleaner box that cleans the air guided by the pair of the right and left air duct portions; and
   a vehicle body frame that is branched backward from a steering head pipe into a bifurcated shape with a pair of right and left members, the steering head pipe being disposed on a front side of the vehicle, the vehicle body frame including the air cleaner box between branches of the bifurcated shape, wherein the air duct portion includes:
a first air duct that guides air to the air cleaner box from the air intake port through the vehicle body frame, and
a second air duct that branches from the first air duct in a middle to guide air to the air cleaner box.

2. The air intake structure for a saddle-ride vehicle according to claim 1, further comprising:
a pair of right and left front forks that rotatably support a front wheel, wherein
the vehicle body frame includes a pair of right and left first holes, and a pair of right and left second holes that are disposed between the pair of right and left first holes,
the first air duct guides air to the air cleaner box through the first holes, and
the second air duct is inserted between the pair of right and left front forks, and guides air to the air cleaner box through the second holes.

3. The air intake structure for a saddle-ride vehicle according to claim 1, wherein
the first air duct includes a branch hole on a top surface,
the second air duct includes an opening that communicates with the branch hole, and
the opening obliquely opens forward and downward.

4. The air intake structure for a saddle-ride vehicle according to claim 1, further comprising:
a brace that is fixed to the steering head pipe and supports a meter unit, wherein
the second air duct is disposed on both right and left sides across the brace.

* * * * *